(12) United States Patent
Tanaka

(10) Patent No.: US 8,494,289 B2
(45) Date of Patent: Jul. 23, 2013

(54) INFORMATION PROCESSING APPARATUS, IMAGE COMPRESSION METHOD, AND STORAGE MEDIUM

(75) Inventor: Hirotomo Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 12/975,318

(22) Filed: Dec. 21, 2010

(65) Prior Publication Data

US 2011/0158549 A1 Jun. 30, 2011

(30) Foreign Application Priority Data

Dec. 28, 2009 (JP) ................................. 2009-298747

(51) Int. Cl.
*G06K 9/36* (2006.01)
*G06K 9/46* (2006.01)
(52) U.S. Cl.
USPC ........................................................ 382/232
(58) Field of Classification Search
None
See application file for complete search history.

(56) References Cited

U.S. PATENT DOCUMENTS

| 5,757,965 A | 5/1998 | Ohki | |
|---|---|---|---|
| 2002/0196467 A1* | 12/2002 | Delhoune et al. | 358/1.18 |
| 2004/0091162 A1* | 5/2004 | Donahue et al. | 382/245 |
| 2009/0002762 A1* | 1/2009 | Sakamoto et al. | 358/1.16 |
| 2011/0026042 A1* | 2/2011 | Cogan et al. | 358/1.2 |

FOREIGN PATENT DOCUMENTS

JP 5-064001 A 3/1993

* cited by examiner

*Primary Examiner* — Li Liu
(74) *Attorney, Agent, or Firm* — Canon USA Inc. IP Division

(57) ABSTRACT

If reusable data is included in a record of VDP data, a compression level used in compressing page data including the reusable data is associated with the reusable data and stored together with the reusable data. If, after that, a record of VDP data including reusable data similar to the stored reusable data is generated, the page data is compressed according to the record based on the compression ratio associated with the stored reusable data.

19 Claims, 18 Drawing Sheets

| COMPRESSION LEVEL | TARGET COMPRESSION LEVEL |
|---|---|
| Q1 | 1/2 OF THE SIZE OF ORIGINAL DATA |
| Q2 | 1/4 |
| Q3 | 1/8 |
| Q4 | 1/16 |

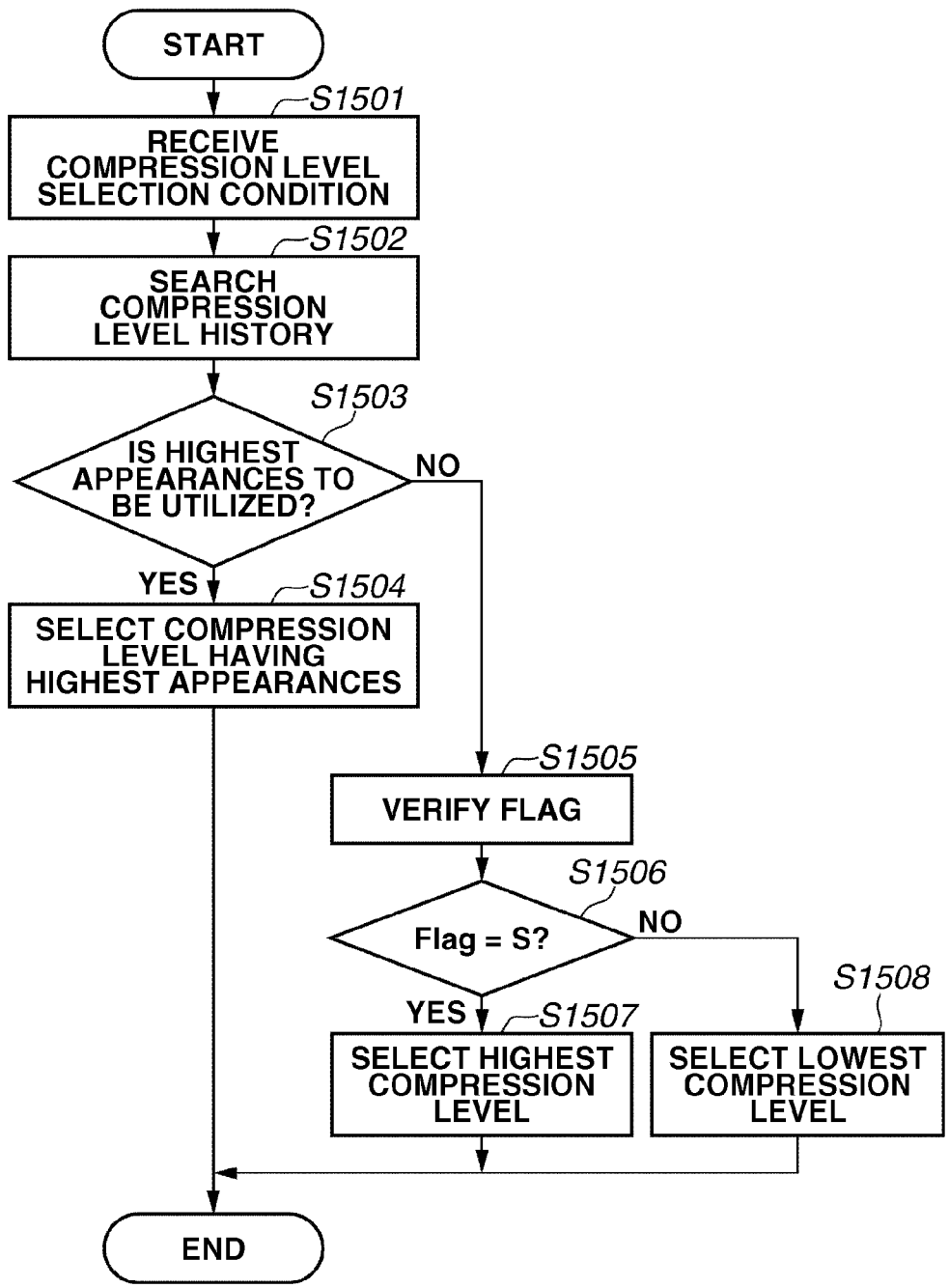

INFORMATION PROCESSING APPARATUS, IMAGE COMPRESSION METHOD, AND STORAGE MEDIUM

BACKGROUND OF THE INVENTION

1. Field of the Invention

The present invention relates to an information processing apparatus, an image compression method, and a storage medium. In particular, the present invention relates to a method useful for compressing a non-compressed image and storing the compressed image data, and decompressing the compressed image data.

2. Description of the Related Art

An image forming apparatus, such as a printer, which prints a color image at a high resolution and high gradation, generally compresses image data. In an image forming apparatus having a development unit drum transfer type image forming apparatus, which is a mainstream apparatus in the field of printing, it is necessary to continue transmitting data of each page to a fixing device at a predetermined timing.

If image data of high resolution and high gradation is input, because its data size is large, it takes a long time to process data within the image forming apparatus. In addition, because the size of a hard disk drive (HDD) and a memory is limited, the image forming apparatus compresses image data to reduce the data size of data to be processed. In addition, by using dedicated hardware, the image forming apparatus can decompress image data that has been compressed to a predetermined size in a short time.

In a conventional image forming apparatus discussed in Japanese Patent Application Laid-Open No. 05-64001, in order to implement printing at a high printing speed, page data is compressed to a predetermined small size, which is determined for each compression ratio, by changing the compression ratio.

In a large sense, a lossless compression method and a lossy compression method are used as the method for compressing an image executed in the image forming apparatus like this. In printing a color image, the image forming apparatus uses the lossy compression method, such as Joint Photographic Experts Group (JPEG), which can implement a high compression ratio. When such a lossy compression method is used, the image quality of resulting data may be low because the compression ratio thereof is high. On the other hand, in generating data having a high image quality, it is necessary to apply a low compression ratio.

Accordingly, in a conventional image forming system, in order to achieve a high image quality, image data is repeatedly compressed with the compression ratio being gradually increased starting from a low compression ratio until the amount (size) of image data after compression becomes a predetermined size or smaller. Thus, the balance between the data amount and image quality is achieved.

If data for variable data printing (VDP) has been input, the image forming system like this processes its page data in the unit of an object (data), such as a text or an image. "VDP" refers to a printing method in which a user who desires to print a document produces a print product uniquely produced for each customer, who receives the print product.

The image forming system provides a print product optimally produced for each customer by generating page data based on a combination of data previously rasterized by using a raster image processor (RIP) and data for each customer.

When VDP data is input, the image forming system stores data reusable within the same document as a reusable object (reusable data). In printing the VDP data that uses the reusable data again, the image forming system RIP-processes variable data only, and generates page data by combining the RIP-processed variable data and the stored reusable data. As described above, it becomes unnecessary for the conventional image forming system to execute RIP processing on the reusable data. Thus, the print time can be reduced.

However, in printing VDP data in the image forming system capable of compressing image data, if page data including reusable data is compressed again and again, the image forming system also re-compresses another page data that utilizes the reusable data. If data is re-compressed, a long processing time becomes necessary for printing the data. Accordingly, in this case, the printing performance of the image forming system may be affected.

SUMMARY OF THE INVENTION

According to an aspect of the present invention, an information processing apparatus includes an analysis unit configured to analyze image generation instruction data including a reusable object, a variable object, and layout information about the object, a storage unit configured to store raster data of the reusable object, a generation unit configured to generate image data based on a combination of the raster data of the reusable object stored on the storage unit and the raster data of the variable object included in the image generation instruction data, a derivation unit configured to derive information about a compression ratio of the image data generated by the generation unit, an assignation unit configured to assign the information about the compression ratio used in compressing the image data including the reusable object to the reusable object, and an output unit configured to output the image data generated by the generation unit and the information about the compression ratio derived by the derivation unit to a compression unit configured to compress the image data. In the information processing apparatus, the derivation unit is configured, if a reusable object similar to the reusable object to which the information about the compression ratio has been assigned is included in the image data generated by the generation unit, to derive the information about the compression ratio assigned to the reusable object as a compression ratio of the image data generated by the generation unit.

According to an aspect of the present invention, information about a compression ratio for generated image data is derived based on information about a compression ratio used in a past operation executed on image data including the same reusable object as a reusable object included in the generated image data. Therefore, in forming an image that utilizes the reusable object, the necessary number of times of compressing the image data can be effectively reduced. Accordingly, the time for forming an image can be shortened.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

FIG. 16 illustrates an example of a compression level.

FIG. 18 is a flow chart illustrating an exemplary flow of compression level comparison processing.

DESCRIPTION OF THE EMBODIMENTS

Figure 1:
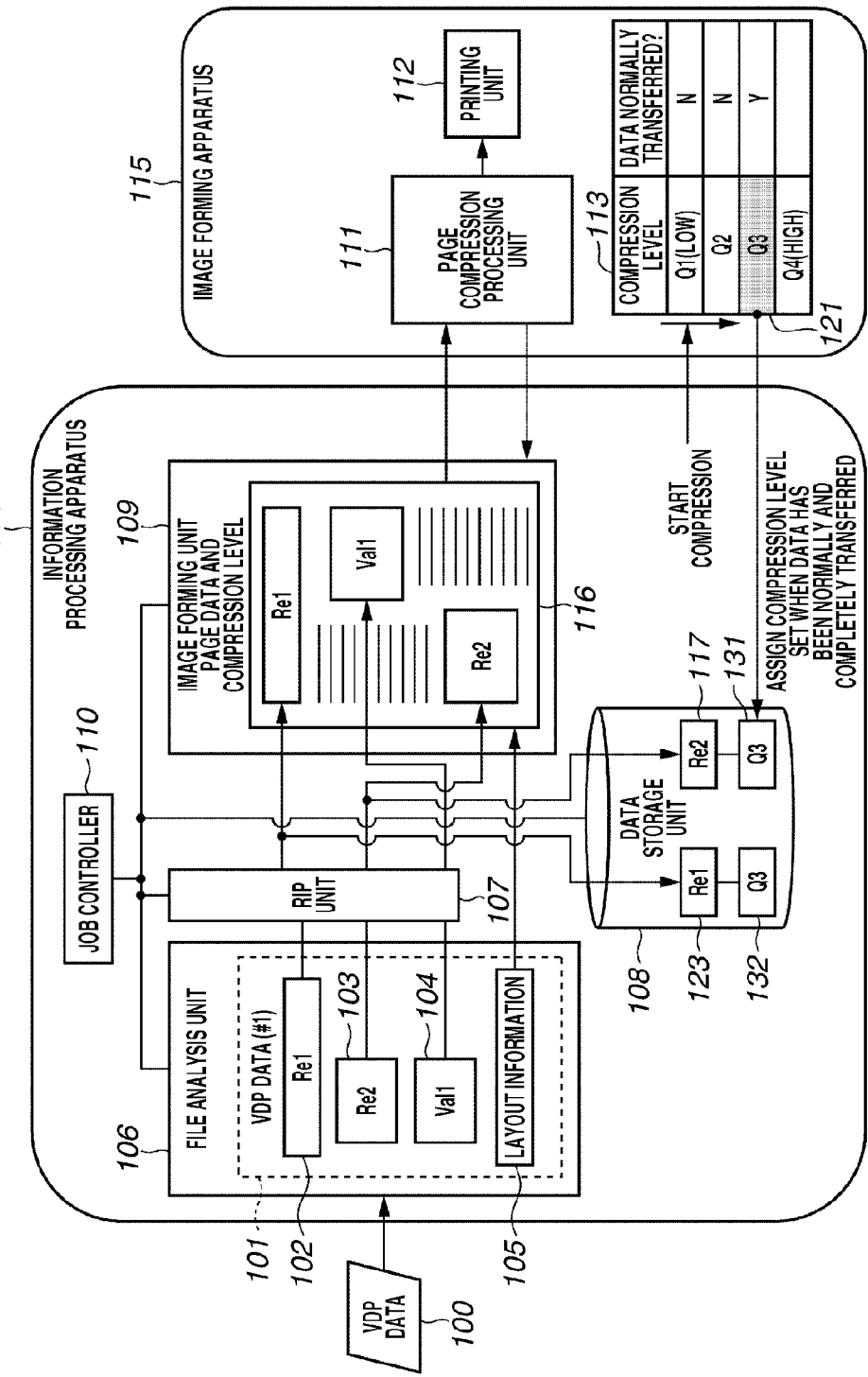
FIG. 1 illustrates an example of a first operation executed by an image forming system according to a first exemplary embodiment of the present invention.

Various exemplary embodiments, features, and aspects of the invention will be described in detail below with reference to the drawings.

FIGS. 1 through 4 illustrate an exemplary configuration of an image forming system of the present invention. In each example illustrated in FIGS. 1 through 4, different methods of processing executed by the image forming system in different situations are schematically illustrated in FIGS. 1 through 4 but each exemplary image forming system illustrated in FIGS. 1 through 4 has the same configuration.

Referring to FIGS. 1 through 4, the image forming system includes an information processing apparatus 114 and an image forming apparatus 115. The information processing apparatus 114 can be implemented by a personal computer (PC). The image forming apparatus 115 can be implemented by a multifunction peripheral (MFP) or a printer. The information processing apparatus 114 and the image forming apparatus 115 can communicate with each other via a network.

The information processing apparatus 114 includes a file analysis unit 106, a RIP unit 107, a data storage unit 108, an image forming unit 109, and a job controller 110. The file analysis unit 106 receives VDP data 100 and analyzes a structure thereof. The RIP unit 107 generates raster data based on the VDP data 100.

The data storage unit 108 stores a reusable object, which is raster data. The image forming unit 109 generates page data 116 and 122 by merging raster data (reusable object) stored on the data storage unit 108 and the raster data (variable object) generated by the RIP unit 107. In addition, the image forming unit 109 assigns a compression level to the page data 116 and 122 and transfers the same to the image forming apparatus 115. The job controller 110 controls each component of the information processing apparatus 114.

The image forming apparatus 115 includes a page compression processing unit 111, which receives the page data 116 and data 122 that have been input by the information processing apparatus 114 and compresses the page data 116 and 122 at a compression level designated by the information processing apparatus 114. In addition, the image forming apparatus 115 includes a printing unit 112, which executes printing.

"VDP" is a printing method in which a user who desires to print a document produces a print product uniquely produced for each customer, who receives the print product. By using VDP, a print product optimally produced for each customer can be produced and provided to each customer by producing the print product based on a combination of previously rasterized data (reusable object) and data of each customer (variable object).

VDP data is an example of image generation instruction data, which includes various settings, such as layout information necessary for producing a print product and image data to be printed. The VDP data 100 input to the information processing apparatus 114 is processed in the unit of a record. A "record" is a part of a print job including data of one or more pages.

Generally, in executing VDP, a document to be distributed to each customer is generated in the unit of a record. Image data and text data used in a document to be distributed to a customer includes data, such as "object". An object includes two types. More specifically, an object includes a reusable object, which is an example of an object that can be reused (hereinafter simply referred to as "reusable data"), and a variable object, which is an example of an object that can arbitrarily vary (hereinafter simply referred to as "variable data").

Reusable data can be reused as its name describes. A reusable data is used for a plurality of records. More specifically, the reusable data is rasterized by the RIP unit 107 after being read at the start of the processing. The raster image obtained by converting the reusable data is stored on the data storage unit 108. Variable data is data uniquely used for a page. Variable data is not intended to be used sharedly with another page. In other words, after printing a page, the variable data therefor is deleted from a cache.

Hereinbelow, an operation according to an exemplary embodiment of the present invention from the receipt of the VDP data 100 to the printing of the input data will be described in detail. The operation of each of the image forming apparatus 115 and the information processing apparatus 114 will be described separately from each other in the following description.

<Operation of Image Forming Apparatus 115>

In an image forming apparatus having a development unit, which is a drum transfer type and which is a mainstream apparatus in the field of printing, it is necessary to continue transmitting data of each page at a predetermined timing. As the quality of an image becomes higher and higher, the data size of a page becomes larger and larger. Accordingly, in order to process data at a sufficiently high printing speed, a conventional image forming apparatus executes compression (image compression) of page data.

In addition, by using dedicated hardware, the conventional image forming apparatus can decompress compressed image data within a predetermined time. In the image forming apparatus like this, in order to maintain a high printing speed, it is necessary to compress data of each page below a specific compression target size S.

In the present exemplary embodiment, it is supposed that the page compression processing unit 111 previously stores a plurality of predetermined compression levels 113. The compression level 113 corresponds to the compression ratio of page data. More specifically, the higher the value of the compression level becomes, the higher the compression ratio becomes but the lower the image quality of page data may become.

On the contrary, the lower the compression level becomes, the lower the compression ratio becomes but the higher the image quality of page data becomes, which is closer to the image quality of the page data in a non-compressed state. For the compression level, in the present exemplary embodiment, a compression target size S for setting the compression level down to 1/n of the original image size is used.

Figure 5:
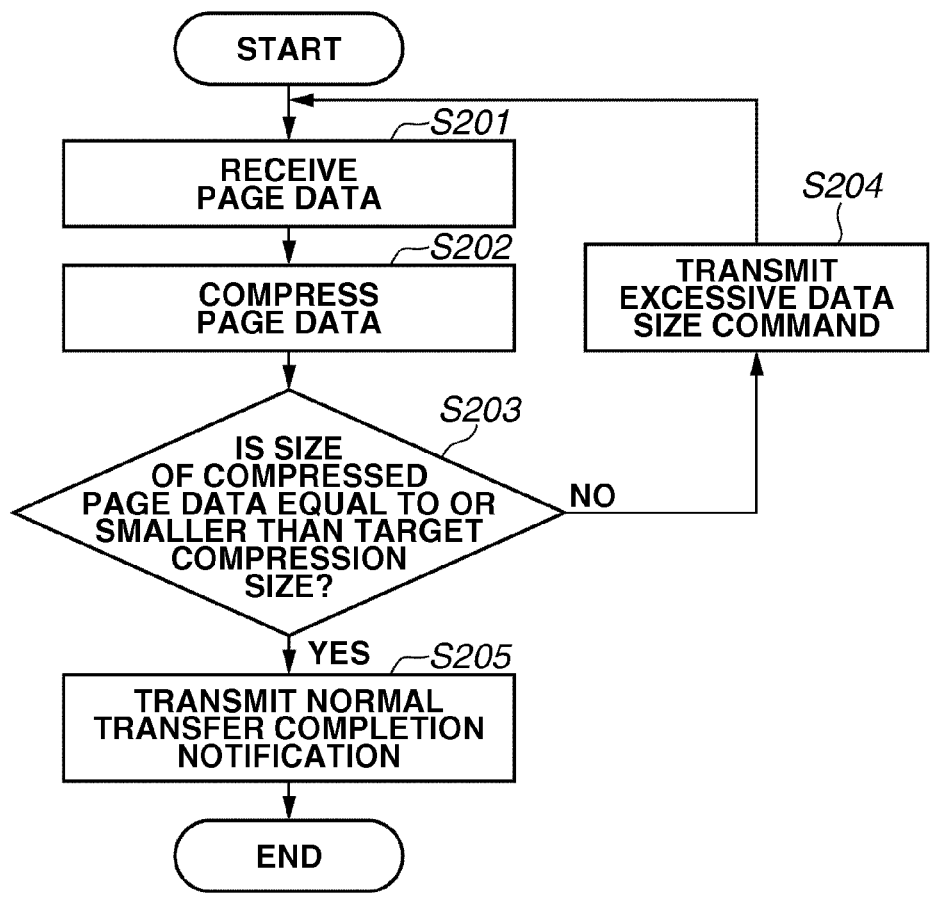
FIG. 5 is a flow chart illustrating an exemplary flow of processing executed by the image forming apparatus.

FIG. 5 is a flow chart illustrating an exemplary flow of processing executed by the image forming apparatus 115 for determining the compression level.

Previously to the processing illustrated in FIG. 5, the image forming unit 109 of the information processing apparatus 114 generates page data and transfers the generated page data to the image forming apparatus 115 together with a default compression level.

Referring to FIG. 5, in step S201, the page compression processing unit 111 of the image forming apparatus 115 receives the page data and the compression level. In step S202, the page compression processing unit 111 compresses the page data at the compression level received in step S201. In step S203, the page compression processing unit 111 determines whether the size of the page data compressed in step S202 is equal to or smaller than the compression target size S.

If it is determined that the size of the compressed page data has exceeded the compression target size S (NO in step S203), then the processing advances to step S204. In step S204, the page compression processing unit 111 notifies an excessive data size command to the image forming unit 109. If the excessive data size command has been input, the image forming unit 109 raises the compression level by one unitary level, and transmits the raised compression level to the page compression processing unit 111 together with the page data.

The page compression processing unit 111 repeats the above-described processing until the size of the compressed page data becomes equal to or smaller than the compression target size S. If it is determined that the size of the compressed page data has become equal to or smaller than the compression target size S (YES in step S203), then the processing advances to step S205. In step S205, the page compression processing unit 111 notifies the information that the size of the compressed page data is equal to or smaller than the compression target size S to the image forming unit 109.

<Operation of Information Processing Apparatus 114>

Figure 6:
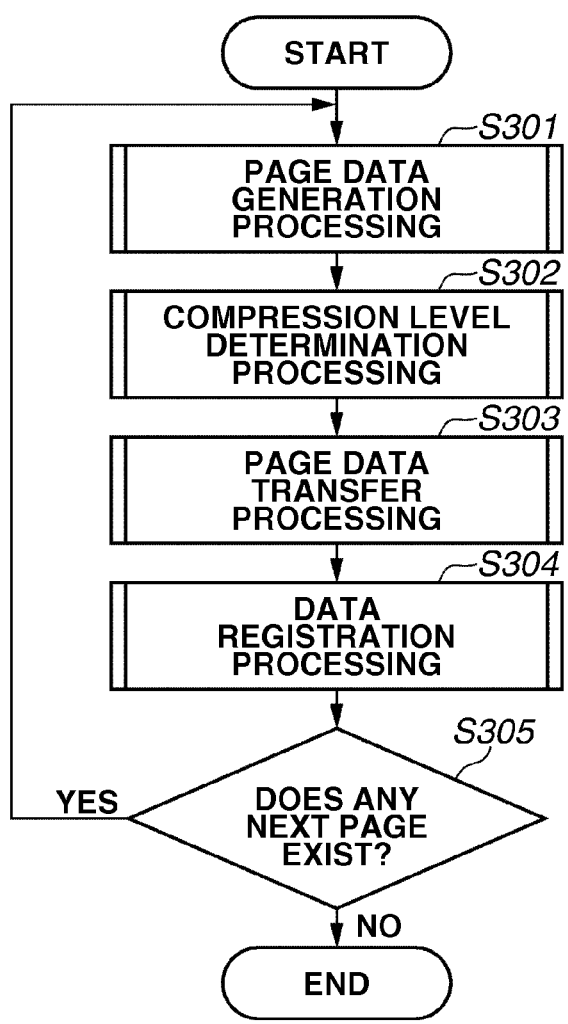
FIG. 6 is a flow chart illustrating an exemplary flow of processing executed by an information processing apparatus.

FIG. 6 is a flow chart illustrating an exemplary flow of processing executed by the information processing apparatus 114 for determining the compression level.

Referring to FIG. 6, the information processing apparatus 114 executes four types of processing in a large sense. In the example illustrated in FIG. 6, in step S301, the information processing apparatus 114 executes page data generation processing for generating page data based on VDP data and reusable data (raster data of reusable data). In step S302, the information processing apparatus 114 executes compression level determination processing for determining (deriving) a compression level to be transmitted to the page compression processing unit 111 of the image forming apparatus 115.

In step S303, the information processing apparatus 114 executes page data transfer processing for transferring (outputting) page data generated by merging the reusable data and the variable data to the image forming apparatus 115 together with the determined compression level and for calculating a last compression level for compressing the page data.

In step S304, the information processing apparatus 114 executes data registration processing for storing metadata on the data storage unit 108 and the VDP data 100 together with the reusable data. "Metadata" is additional data for specific data itself, which is assigned to the specific data. In step S305, the information processing apparatus 114 executes the processing in steps S301 through S304 in the unit of a page. In the following description, each of the processing in steps S301 through S304 will be described in detail in order of the step number.

<Page Data Generation Processing in Step S301>

Figure 7:
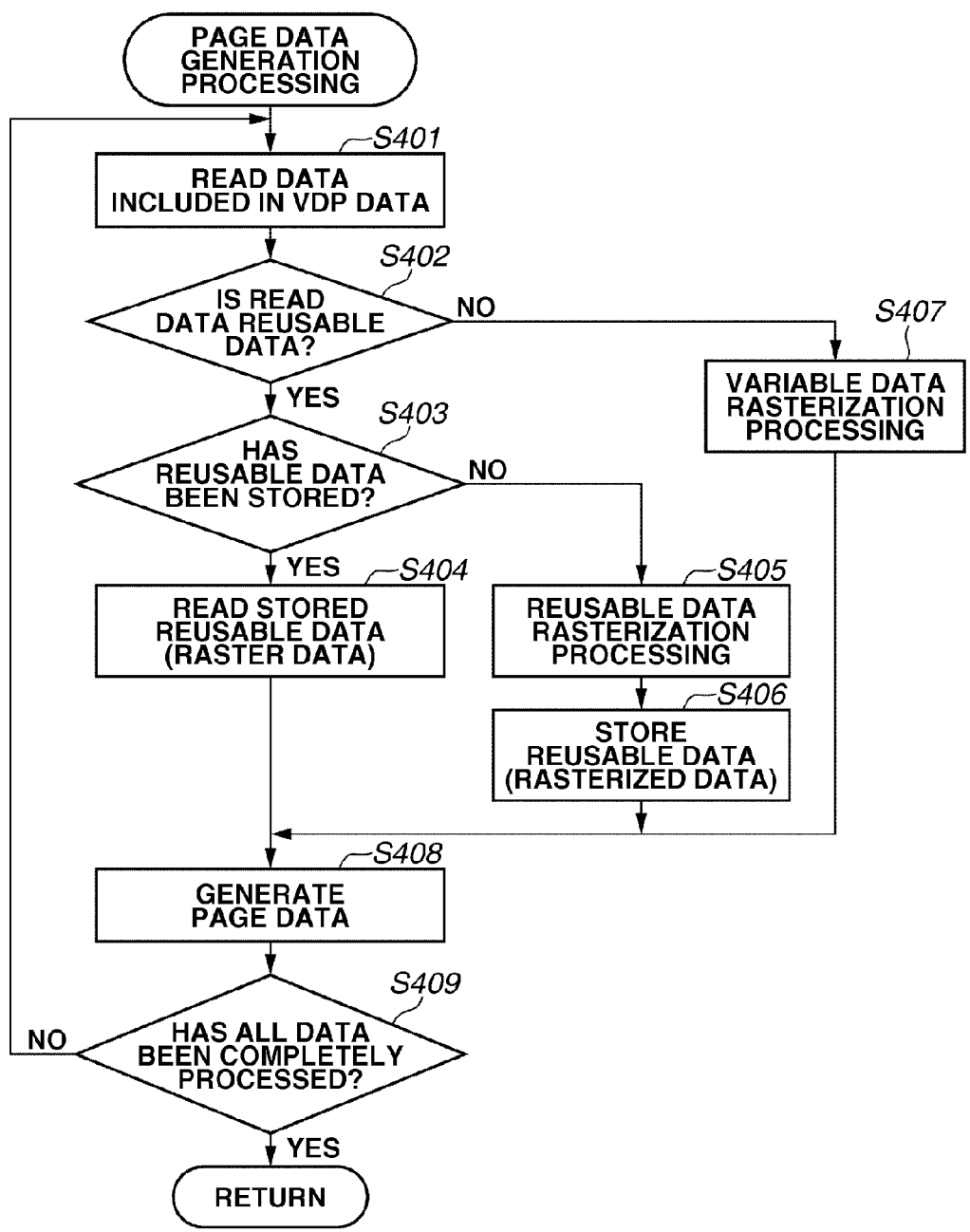
FIG. 7 is a flow chart illustrating an exemplary flow of processing executed in step S301 illustrated in FIG. 6.

FIG. 7 is a flow chart illustrating an exemplary flow of the page data generation processing in step S301 illustrated in FIG. 6. In the page data generation processing, page data of one page is generated in one loop.

After receiving the VDP data 100 input by an application, in step S401, the file analysis unit 106 executes an analysis for determining whether the received VDP data 100 includes reusable data 102 and 103. In executing the determination, at first, the file analysis unit 106 (serially) reads data included in the VDP data 100.

In step S402, the file analysis unit 106 determines whether the read data is reusable data. If it is determined that the read data is reusable data (YES in step S42), then the processing advances to step S403. In step S403, the file analysis unit 106 determines whether (raster data of) the reusable data has been stored on the data storage unit 108.

If it is determined that the reusable data has been stored on the data storage unit 108 (YES in step S403), then the processing advances to step S404. In step S404, the file analysis unit 106 reads the raster data of the reusable data from the data storage unit 108.

On the other hand, if it is determined that the reusable data has not been stored on the data storage unit 108 (NO in step S403), then the processing advances to step S405. In step S405, the RIP unit 107 generates raster data 117 and 123 of the reusable data based on the reusable data acquired by analyzing the VDP data 100. Instep S406, the job controller 110 stores the raster data 117 and 123 of the reusable data, which has been generated in step S405, on the data storage unit 108.

If it is determined that the read data is not reusable data but variable data (NO in step S402), then the processing advances to step S407. In step S407, the RIP unit 107 generates raster data of the variable data.

After generating the raster data in the above-described manner, in step S408, the image forming unit 109 combines each rasterized data based on layout information 105 about the VDP data 100 in the unit of a page, and generates page data 116 and 122. In step S409, the job controller 110 determines whether all data has been completely processed. If it is determined that any unprocessed data remains (NO in step S409), the job controller 110 repeats the above-described processing. On the other hand, if it is determined that all data has been completely processed (YES in step S409), then the processing in the flow chart of FIG. 7 ends.

\<Compression Level Determination Processing in Step S302\>

Figure 8:
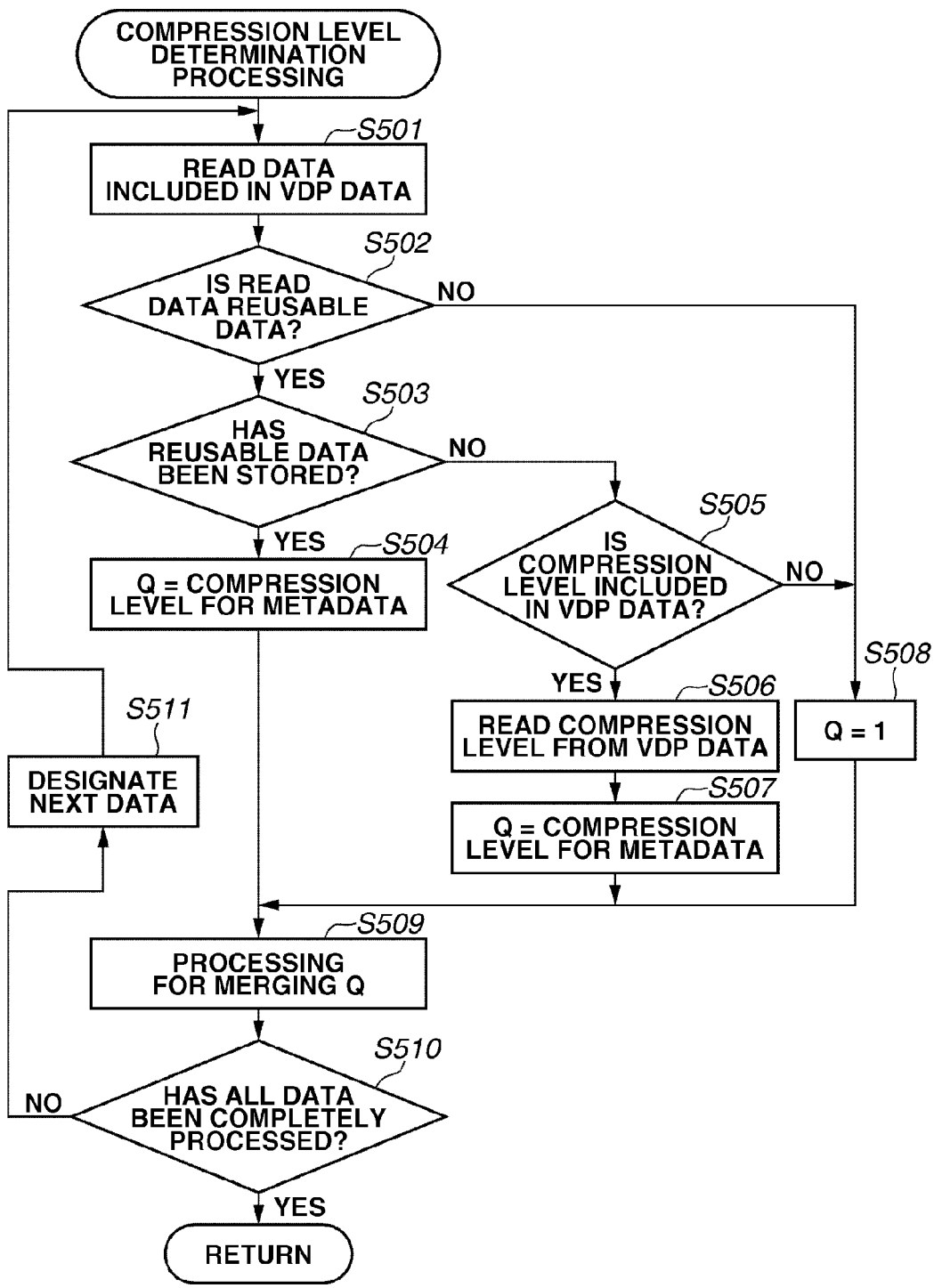
FIG. 8 is a flow chart illustrating an exemplary flow of processing executed in step S302 illustrated in FIG. 6.

FIG. 8 is a flow chart illustrating an exemplary flow of the compression level determination processing in step S302 illustrated in FIG. 6. In the compression level determination processing, the job controller 110 verifies data included in one page in one loop, and determines the compression level to be assigned to the page data when the page data is transferred.

Referring to FIG. 8, in step S501, the file analysis unit 106 (serially) reads data included in the VDP data 100. In step S502, the file analysis unit 106 determines whether the read data is reusable data.

If it is determined that the read data is reusable data (YES in step S502), then the processing advances to step S503. In step S503, the file analysis unit 106 determines whether the raster data 117 and 123 of the same reusable data as the reusable data 102 and 103 has been stored on the data storage unit 108.

If it is determined that the raster data 117 and 123 of the reusable data has been stored on the data storage unit 108 (YES in step S503), then the processing advances to step S504. In step S504, the RIP unit 107 employs the compression level recorded in metadata 131 and 132 of the raster data 117 and 123 of the reusable data.

On the other hand, if it is determined that the raster data 117 and 123 of the reusable data has not been stored on the data storage unit 108 (NO in step S503), then the processing advances to step S505. In step S505, the file analysis unit 106 verifies metadata 133 and 134 of the reusable data 102 and 103 included in the VDP data 100. In addition, in step S505, the file analysis unit 106 determines whether the compression level has been stored in the metadata 133 and 134.

If it is determined that the compression level has been stored in the metadata 133 and 134 of the reusable data 102 and 103 (YES in step S505), then the processing advances to step S506. In step S506, the RIP unit 107 reads the compression level. In step S507, the RIP unit 107 employs the compression level read in step S506. The processing for storing the compression level in the metadata 133 and 134 of the reusable data 102 and 103 included in the VDP data 100 will be described in detail below.

Figure 2:
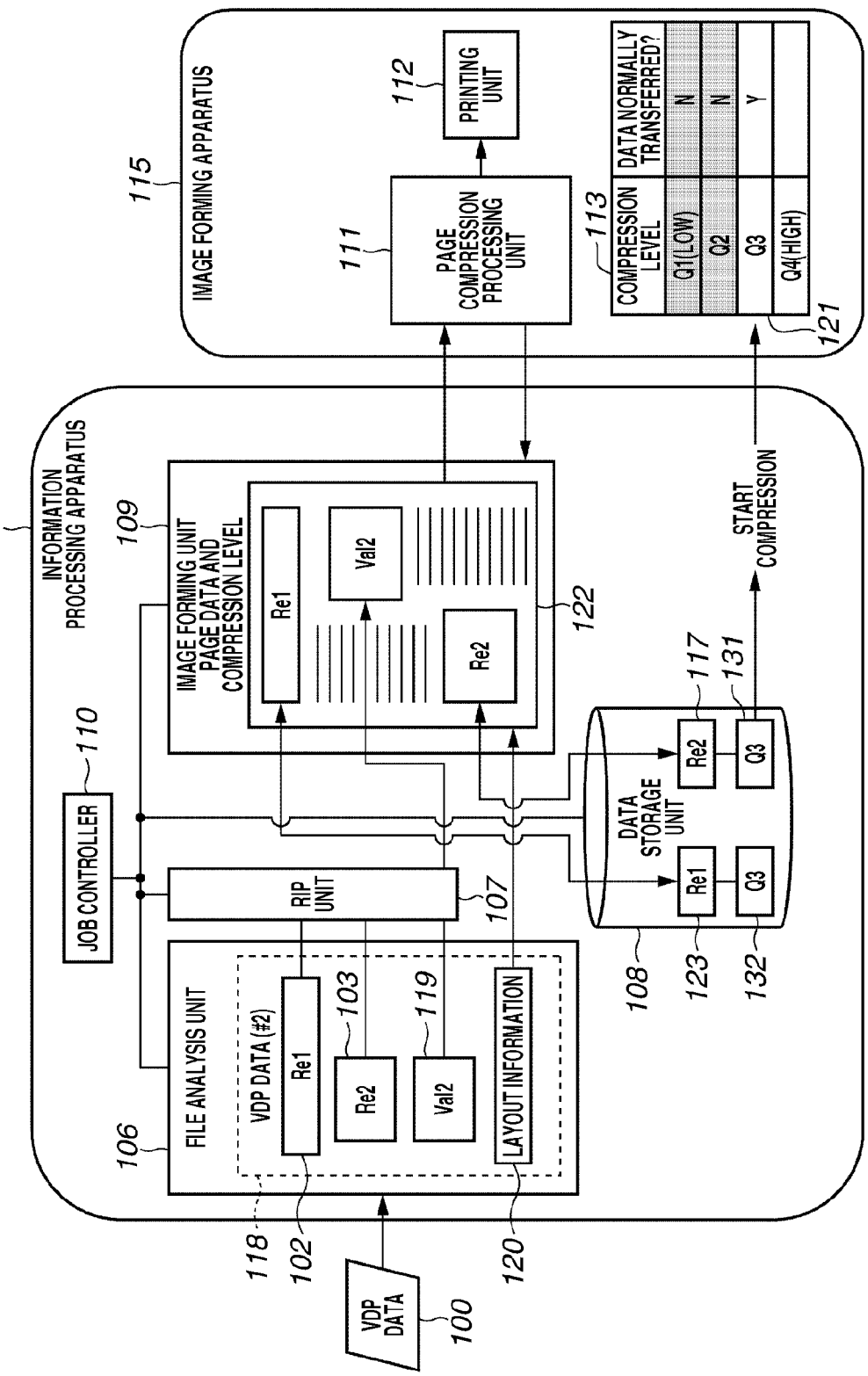
FIG. 2 illustrates an example of a second operation executed by the image forming system.

As described above, the compression level can be described in the metadata 131 and 132 of the raster data 117 and 123 of the reusable data stored on the data storage unit 108 (i.e., in the exemplary cases illustrated in FIGS. 1 and 2). In another cases (i.e., in FIGS. 3 and 4), the compression level can be described in metadata 134 and 135 of the reusable data 102 and 103 included in the VDP data 100.

If it is determined that the compression level has not been stored in the metadata of the reusable data 102 and 103 included in the VDP data 100 (NO in step S505) and if it is determined that the read data is not reusable data (NO in step S502), then the processing advances to step S508. In step S508, the RIP unit 107 sets an initial value (=Q1) of the compression level.

After determining the compression level in the above-described manner, in step S509, the image forming unit 109 executes merging for determining the compression level for the page data. After executing the merging, in step S510, the image forming unit 109 determines whether the processed data is the last data included in the page data.

If it is determined that the processed data is not the last data included in the page data (NO in step S510), then the processing advances to step S511. In step S511, the file analysis unit 106 increments a count value and designates next data. Then the processing returns to step S501 and the processing in step S501 and subsequent steps is executed.

On the other hand, if it is determined that the processed data is the last data included in the page data (YES in step S510), then the job controller 110 determines that the compression level for the page data has been appropriately determined. In this case, the processing in the flow chart of FIG. 8 ends there.

\<Compression Level Merging Processing in Step S509\>

Figure 9:
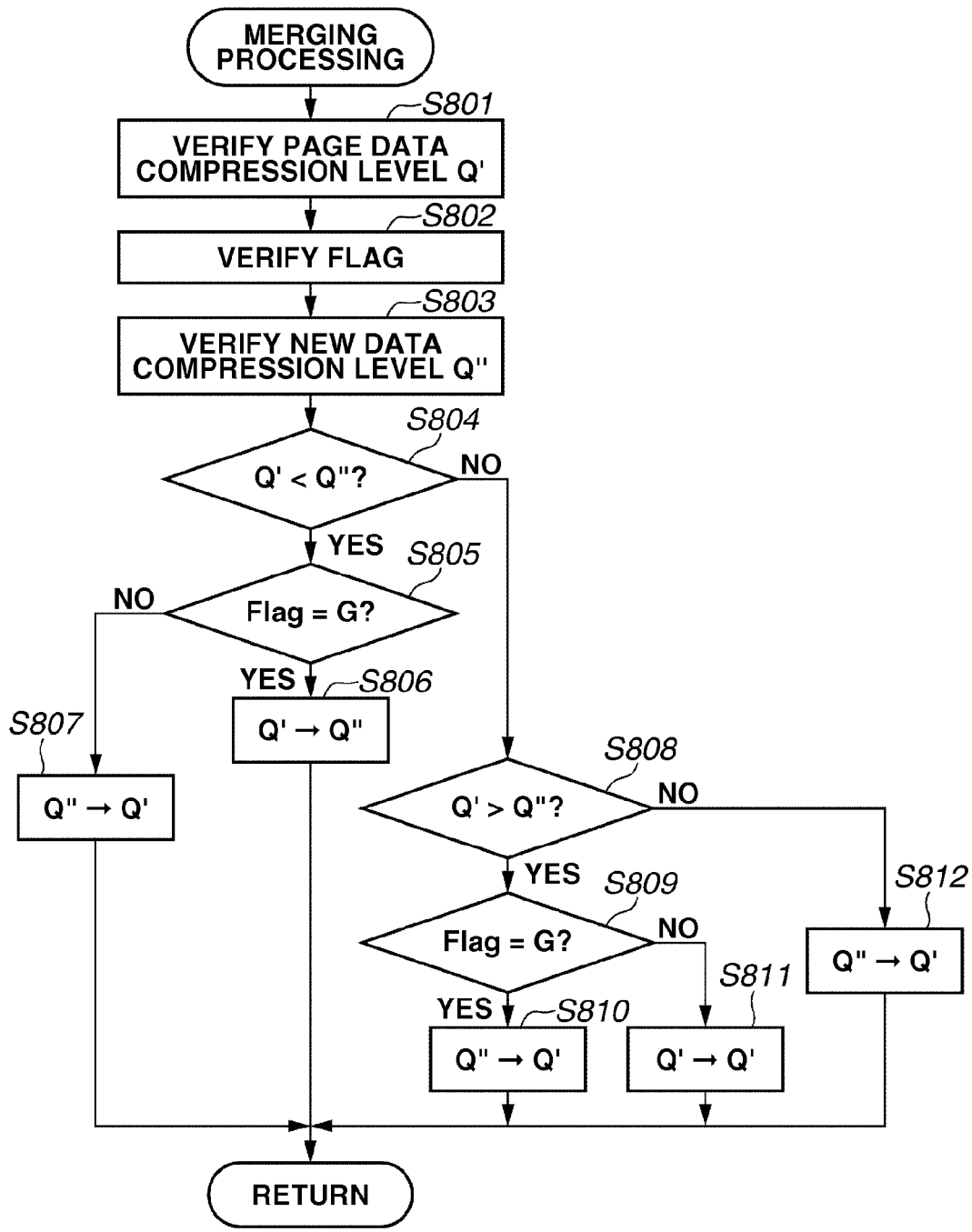
FIG. 9 is a flow chart illustrating an exemplary flow of processing executed in step S509 illustrated in FIG. 8.

FIG. 9 is a flow chart illustrating the compression level merging processing in step S509 of FIG. 8. In FIGS. 1 through 4, compression levels Q1, Q2, and the like are used. More specifically, the greater the numerical character is assigned to each compression level Q, the higher the corresponding compression ratio becomes.

The image forming unit 109 verifies the newly employed compression level, compares it with the compression level employed so far, and selects an optimum compression level. In the following description, a case where a method for selecting the compression level is changed according to a mode will be described.

Figure 10:
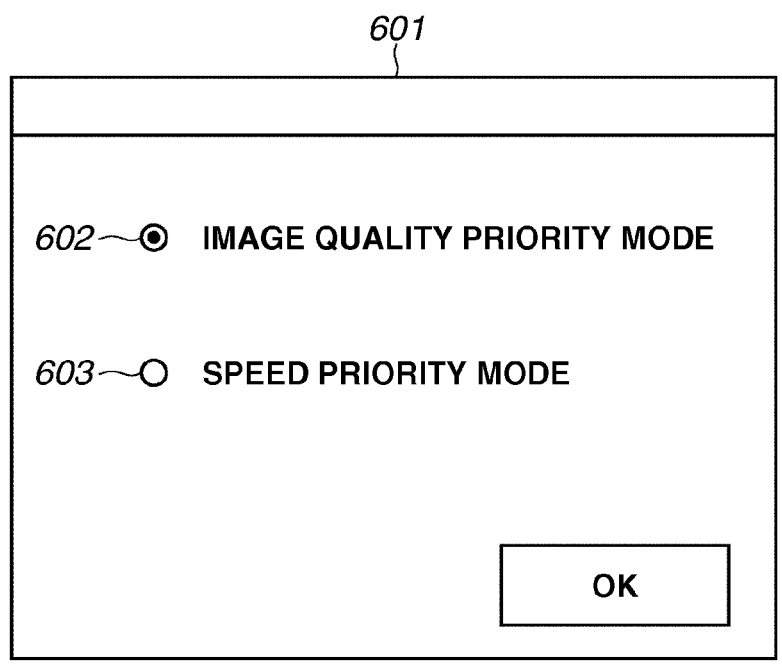
FIG. 10 illustrates an example of a user interface (UI) for setting a mode for selecting a compression level.
Figure 11:
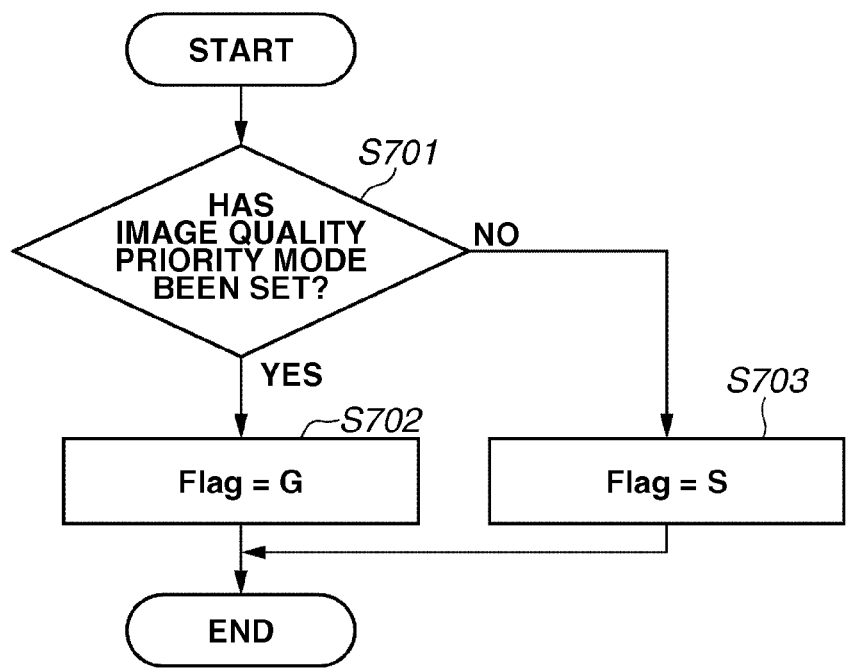
FIG. 11 is a flow chart illustrating an exemplary flow of processing for setting a compression level selection mode.

The job controller 110 allows a user to previously set a mode used in processing to be executed via a UI. FIG. 10 illustrates an example of a UI for setting the mode for selecting the compression level. Referring to FIG. 10, a UI 601 is displayed on a display of the information processing apparatus 114 under control of the job controller 110. FIG. 11 is a flowchart illustrating an exemplary flow of processing for setting the mode used in selecting the compression level.

The image forming unit 109 previously stores a flag. Referring to FIG. 11, in step S701, the image forming unit 109 determines whether the user has selected a radio button 602 for an image quality priority mode based on the content of the operation executed by the user via the UI 601. If it is determined that the radio button 602 for the image quality priority mode has been selected by the user (YES in step S701), then the processing advances to step S702. In step S702, the image forming unit 109 sets a value "G" to the flag.

On the other hand, if it is determined that a radio button 603 for selecting a speed priority mode has been selected by the user (NO in step S701), then the processing advances to step S703. In step S703, the image forming unit 109 sets a value "S" to the flag.

Returning to FIG. 9, in step S801, the image forming unit 109 verifies the compression level Q' of the page data stored in the image forming unit 109. In the present exemplary embodiment, it is supposed that the compression level Q' has already been determined (selected) from among the compression levels that have been employed to the data read in step S501 in a past operation.

In step S802, the image forming unit 109 verifies a setting of the flag. In step S803, the image forming unit 109 verifies a compression level Q" for the newly read data. More specifically, the compression level Q" is a compression level employed for the data read in step S501 in the current operation.

In step S804, the image forming unit 109 determines whether the compression level Q' is lower than the compression level Q" for the newly read data. If it is determined that the compression level Q' is lower than the compression level Q" for the newly read data (YES in step S804), then the processing advances to step S805. In step S805, the image forming unit 109 determines whether the value "G" (the value corresponding to the image quality priority mode) has been set to the flag.

If it is determined that the value "G" has been set to the flag (YES in step S805), then the processing advances to step S806. In step S806, the image forming unit 109 sets the value of the compression level Q' for the page data as the compression level after the merging. Then the processing illustrated in the flow chart of FIG. 9 ends.

On the other hand, if it is determined that the value "S" has been set to the flag instead of the value "G" (NO in step S805), then the processing advances to step S807. In step S807, the image forming unit 109 sets the value of the compression level Q" for the newly read page data to the compression level Q' of the page data as the compression level after the merging. Then the processing in the flow chart of FIG. 9 ends.

On the other hand, if it is determined that the compression level Q' for the page data is not lower than the compression level Q" for the newly read page data (NO in step S804), then the processing advances to step S808. In step S808, the image forming unit 109 determines whether the compression level Q' for the page data is higher than the compression level Q" for the newly read page data.

If it is determined that the compression level Q' for the page data is higher than the compression level Q" for the newly read page data (YES in step S808), then the processing advances to step S809. In step S809, the image forming unit 109 determines whether the value "G" (i.e., the value corresponding to the image quality priority mode) has been set to the flag.

If it is determined that the value "G" has been set to the flag (YES in step S809), then the processing advances to step S810. In step S810, the image forming unit 109 sets the value of the compression level Q" for the newly read page data to the compression level Q' for the page data as the compression level after the merging. Then the processing in the flow chart of FIG. 9 ends.

On the other hand, if it is determined that the value "G" has been set to the flag instead of the value "S" (i.e., the value corresponding to the speed priority mode) (NO in step S809), then the processing advances to step S811. In step S811, the image forming unit 109 sets the value of the compression level Q' for the page data to the compression level Q' for the page data as the compression level after the merging. Then the processing in the flow chart of FIG. 9 ends.

On the other hand, if it is determined that the compression level Q' for the page data is not higher than the compression level Q" for the newly read page data (i.e., if Q'=Q") (NO in step S808), then the processing advances to step S812. In step S812, the image forming unit 109 sets the value for the compression level Q" of the newly read page data to the compression level Q' for the page data. Then the processing in the flow chart of FIG. 9 ends.

By executing the above-described processing, if a plurality of pieces of reusable data is included in the page data, the present exemplary embodiment can determine an appropriate compression level.

<Page Data Transfer Processing in Step S303>

Figure 12:
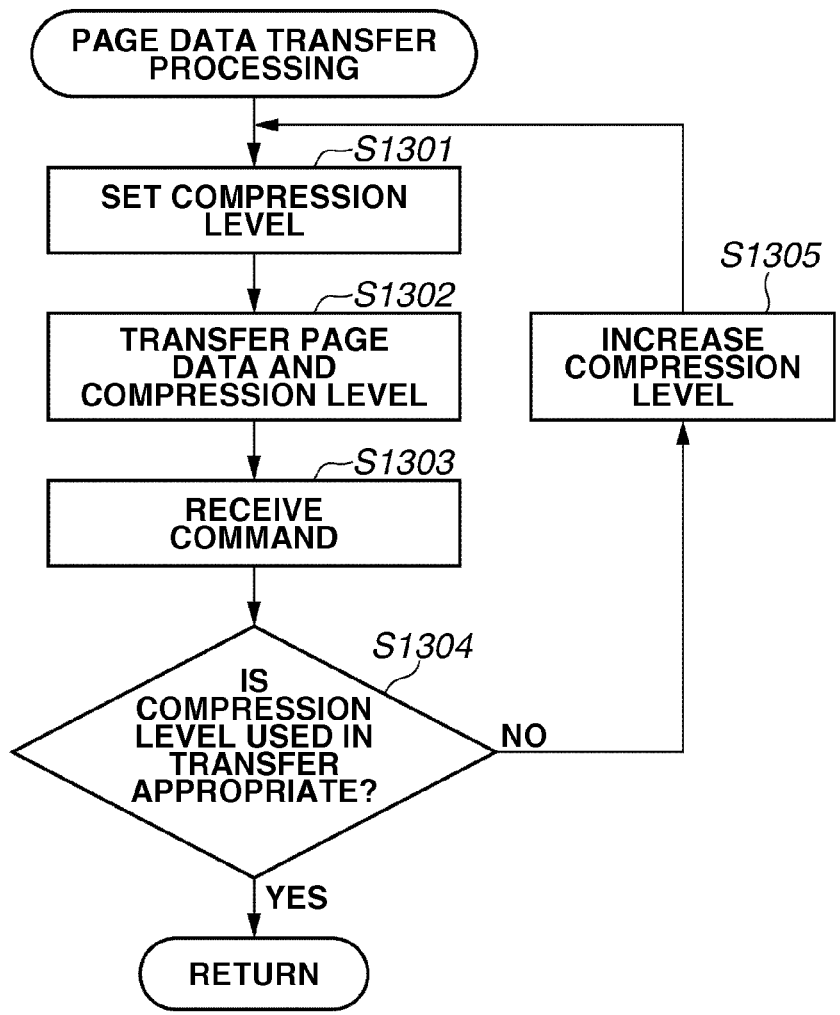
FIG. 12 is a flow chart illustrating an exemplary flow of processing executed in step S303 illustrated in FIG. 6.

FIG. 12 is a flow chart illustrating an exemplary flow of the page data transfer processing in step S303 illustrated in FIG. 6.

After the page data has been determined in step S301 (FIG. 6) and the compression level for the determined page data has been determined in step S302 (FIG. 6), the processing illustrated in FIG. 12 starts. Referring to FIG. 12, in step S1301, the image forming unit 109 sets a compression level for the page data 116 and 122. In step S1302, the image forming unit 109 transfers the page data 116 and 122 and the compression level for the page data 116 and 122 to the image forming apparatus 115.

As described above, the image forming apparatus 115 at first compresses the page data 116 and 122 to print the same. If the size of the page data compressed at the compression level that has been assigned to the page data 116 and 122 is not equal to or smaller than the predetermined compression target size S, the page compression processing unit 111 notifies an excessive data size command to the image forming unit 109 to notify that the data size of the compressed page data has exceeded the predetermined compression target size S.

On the other hand, if it is determined that the size of the page data compressed at the compression level that has been assigned to the page data 116 and 122 is equal to or smaller than the predetermined compression target size S, then the page compression processing unit 111 notifies the fact that the data size of the compressed page data is equal to or smaller than the predetermined compression target size S to the image forming unit 109 by using a command. In step S1303, the image forming unit 109 receives the command.

In step S1304, the image forming unit 109 determines whether the compression level set in the above-described manner is appropriate according to the received command. If it is determined that the compression level set in the above-described manner is not appropriate (NO in step S1304), then the processing advances to step S1305. In step S1305, the image forming unit 109 raises the compression level by one step. Then the processing returns to step S1301. In this case, in step S1301, the image forming unit 109 sets the compression level raised by one step. In step S1302, the image forming unit 109 transfers the raised compression level to the image forming apparatus 115 together with the page data.

If the size of the compressed page data becomes equal to or smaller than the predetermined compression target size S, then the processing advances to step S1303. In step S1303, the image forming unit 109 receives a command notifying that the transfer has been normally completed. If it is determined that the compression level set in the above-described manner is appropriate (YES in step S1304), then the processing in the flow chart of FIG. 12 ends.

<Data Registration Processing in Step S304>

Figure 13:
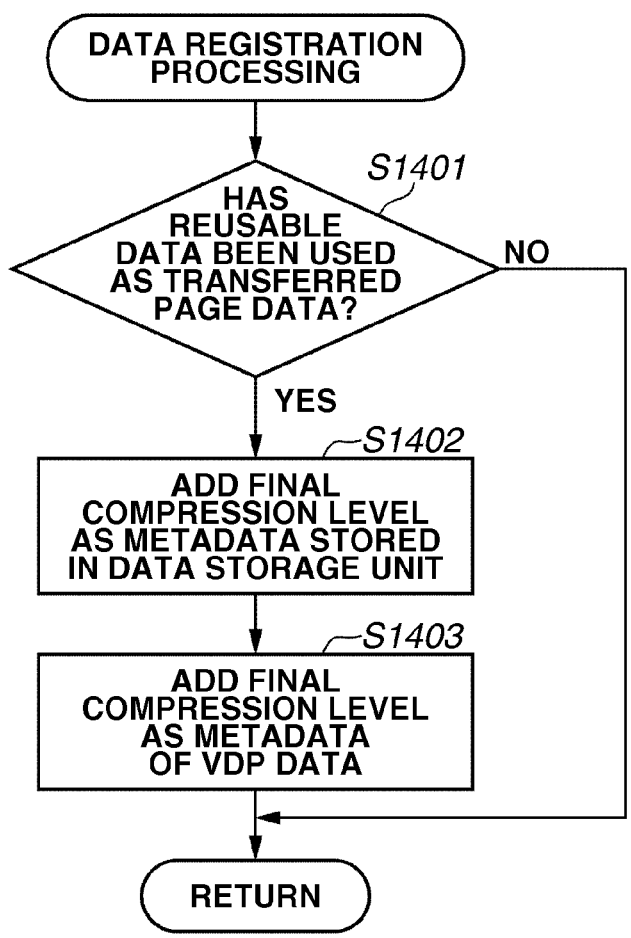
FIG. 13 is a flow chart illustrating an exemplary flow of processing executed in step S304 illustrated in FIG. 6.

FIG. 13 is a flow chart illustrating an exemplary flow of the data registration processing in step S304 illustrated in FIG. 6.

After receiving the command notifying that the transfer has been normally completed from the image forming apparatus 115, the processing in the flowchart of FIG. 13 starts. Referring to FIG. 13, in step S1401, the image forming unit 109 determines whether reusable data is used in the transferred page data. If it is determined that reusable data is not used in the transferred page data (NO in step S1401), then the processing illustrated in the flow chart of FIG. 13 ends.

On the other hand, if it is determined that reusable data is used in the transferred page data (YES in step S1401), then the processing advances to step S1402. In step S1402, the image forming unit 109 assigns a final compression level 121 to raster data 117 and 123 of the reusable data used in the transferred page data, of the reusable data stored on the data storage unit 108, as the metadata 131 and 132.

By executing the above-described processing, the following effect can be achieved in printing the page data that uses the same reusable data as raster data 117 and 123 of the reusable data to which the metadata 131 and 132 including the final compression level 121 has been assigned next time. More specifically, the print time can be shortened by utilizing the final compression level 121 for the metadata 131 and 132 stored on the data storage unit 108.

In step S1403, the image forming unit 109 assigns the final compression level 121 stored on the data storage unit 108 to the reusable data 102 and 103 included in the VDP data 100 as the metadata 133 and 134. If reusable data is not utilized for a long period of time, the reusable data and the corresponding metadata is deleted from the data storage unit 108. The print time can be effectively shortened by utilizing the compression level described in the metadata of the reusable data included in the VDP data in this case.

After completing the assignment of the metadata to the reusable data, the processing illustrated in the flow chart of FIG. 13 ends. Then, the image forming unit 109 generates page data of a next record and a next job.

<Example of Operation>

Figure 3:
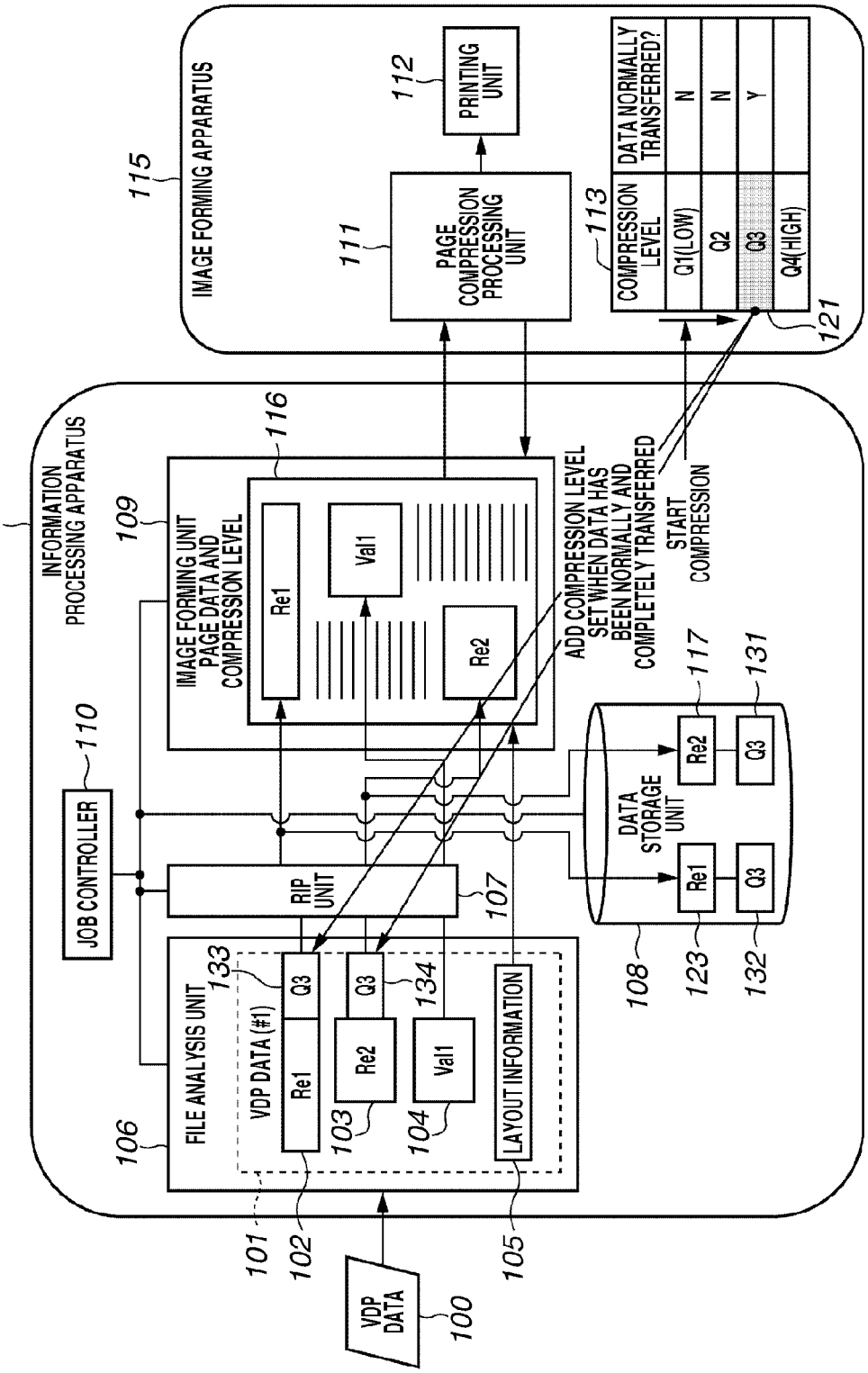
FIG. 3 illustrates an example of a third operation executed by the image forming system.
Figure 4:
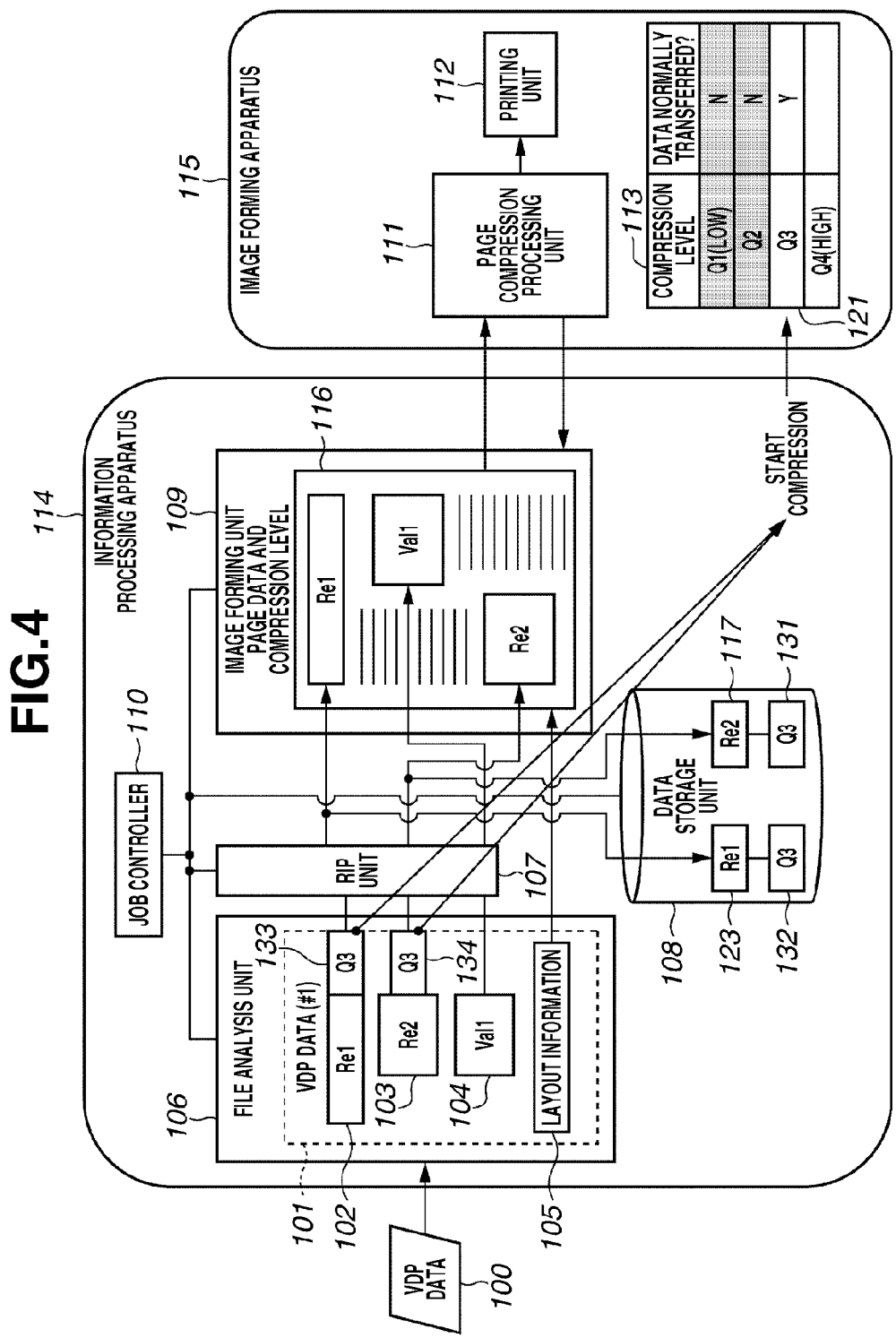
FIG. 4 illustrates an example of a fourth operation executed by the image forming system.

An example of the operation executed in the image forming system according to the exemplary embodiment of the present invention described above will be described below with reference to FIGS. 1 through 4. FIGS. 3 and 4 illustrate a case where metadata has been assigned to the VDP data. The processing for assigning of the compression level to the VDP data as metadata can be implemented by processing substantially similar to the processing for assigning the compression level to the reusable data stored on the data storage unit 108 as metadata. Accordingly, the detailed description thereof will not be repeated here.

FIG. 1 illustrates an example of the processing executed on VDP data, which is executed if the VDP data 100 has been input to the image forming system when no reusable data has been registered thereto yet. More specifically, FIG. 1 illustrates an exemplary operation in which data of a record #1 included in the VDP data 100 (i.e., VDP data 101) is currently processed by the image forming system. FIG. 2 illustrates an exemplary operation in which data of a record #2 included in the VDP data 100 (i.e., VDP data 118) is currently processed after printing the data of the record #1 (i.e., the VDP data 101).

<Processing Executed for Record #1>

The VDP data 101 includes the reusable data 102 and 103, variable data 104, and the layout information 105.

The file analysis unit 106 analyzes the VDP data 100 input by the application. Since no reusable data has been registered to the data storage unit 108, the RIP unit 107 converts all objects included in the VDP data 101 based on a result of the analysis by the file analysis unit 106. The job controller 110 stores the raster data of the reusable data 102 and 103 on the data storage unit 108 after the RIP processing.

The image forming unit 109 generates the page data 116 by merging the raster data of the reusable data 102 and 103 and raster data of the variable data 104 based on the layout information 105, which has been transmitted from the file analysis unit 106.

The page data 116 has never been transferred to the image forming apparatus 115. Accordingly, the compression level Q1, which is the initial value, is assigned to the page data 116. The image forming unit 109 transfers the page data 116, to which the compression level Q1 has been assigned, to the page compression processing unit 111.

The page compression processing unit 111 compresses the page data 116 at the compression level Q1. However, because the size after compression is not equal to or smaller than the predetermined compression target size S, the page compression processing unit 111 inputs an excessive data size command to the image forming unit 109.

If the excessive data size command is input by the page compression processing unit 111, the image forming unit 109 raises the compression level by one step to the compression level Q2. In addition, the image forming unit 109 transfers the page data 116 again, to which the compression level Q2 has been assigned, to the page compression processing unit 111.

The page compression processing unit 111 compresses the page data 116 at the compression level Q2. However, because the size after compression is not equal to or smaller than the predetermined compression target size S, the page compression processing unit 111 transmits an excessive data size command to the image forming unit 109. After receiving the excessive data size command from the page compression processing unit 111, the image forming unit 109 raises the compression level by one step to the compression level Q3. In addition, the image forming unit 109 transfers the page data 116 again, to which the compression level Q3 has been assigned, to the page compression processing unit 111.

The page compression processing unit 111 compresses the page data 116 at the compression level Q3. In this case, because the size after compression is equal to or smaller than the predetermined compression target size S, the page compression processing unit 111 transmits a transfer normal completion command to the image forming unit 109.

After receiving the transfer normal completion command from the page compression processing unit 111, the image forming unit 109 determines that the compression has been normally completed. In this case, the image forming unit 109 then reads the compression level 121 that has been set in the last operation (=the compression level Q3) and stores the read the final compression level 121 on the data storage unit 108. The data storage unit 108 stores the compression level Q3 transmitted from the image forming unit 109 as the metadata 132 of the raster data 123 of the reusable data so that the stored compression level Q3 is linked with the page data (raster data) 116 of the reusable data 102. Similarly, the compression level Q3 is stored in the metadata 131 of the raster data 117 of the reusable data.

<Processing Executed for the Record #2>

The VDP data 118 of the record #2 includes the reusable data 102 and 103, variable data 119, and layout information 120.

The file analysis unit 106 verifies that the reusable data 102 and 103, which has been included in the record #1 (the VDP data 101), is included in the record #2 of the VDP data (the VDP data 118). In addition, the file analysis unit 106 verifies that the variable data 119 is included in the record #2 of the VDP data (the VDP data 118).

The RIP unit 107 generates raster data based on the variable data 119. The image forming unit 109 merges raster data of the variable data 119 and raster data 117 and 123 of the reusable data stored on the data storage unit 108 during the processing for the record #1 based on a result of the analysis by the file analysis unit 106 and the layout information 120. As a result, page data 122 is generated.

The image forming unit 109 acquires the compression level Q3 from the metadata 131 and 132 of the raster data 117 and 123 of the reusable data stored on the data storage unit 108. The image forming unit 109 transfers the generated page data 122 and the compression level Q3 to the page compression processing unit 111.

The page compression processing unit 111 compresses the page data 122 at the compression level Q3 received from the image forming unit 109. Since the size after compression is equal to or smaller than the predetermined compression target size S in this case, the page compression processing unit 111 transmits a transfer normal completion command to the image forming unit 109.

After receiving the transfer normal completion command from the page compression processing unit 111, the image forming unit 109 determines that the compression has been normally completed. In this case, the image forming unit 109 then reads the final compression level 121 (=the compression level Q3) that has been set at the last, and stores the read compression level 121 on the data storage unit 108. The data storage unit 108 stores the compression level Q3 transmitted from the image forming unit 109 as the metadata 132 of the raster data 123 of the reusable data so that the compression level Q3 is linked with the page data 116 (the raster data) of the reusable data 102. Similarly, the compression level Q3 is stored also in the metadata 131 of the raster data 117 of the reusable data.

As described above, in the present exemplary embodiment, if the reusable data is included in the record of the VDP data, the job controller 110 associates the compression level used for the processing on the page data including the reusable data with the reusable data, and stores the reusable data and the compression level on the data storage unit 108.

If, after that, any record of the VDP data including the reusable data similar to the stored reusable data exists, the job controller 110 executes control for compressing the page data based on the record at the compression ratio calculated based on the compression level associated with the stored reusable data. Accordingly, the present exemplary embodiment having the above-described configuration can reduce the number of necessary times of compressing page data that uses reusable data. Therefore, the present exemplary embodiment can shorten the print time.

In addition, if a plurality of pieces of reusable data is included in one record, the job controller 110 selects one compression level among the compression levels associated with the plurality of pieces of reusable data according to a user selection as to which of the image quality and the processing (printing) speed is to be prioritized in the print job. Accordingly, the present exemplary embodiment can appropriately execute the printing as desired by the user.

In the present exemplary embodiment, in step S203 illustrated in FIG. 5, the page compression processing unit 111 determines whether the size of the page data compressed instep S202 is equal to or smaller than the compression target size S. However, the present exemplary embodiment is not limited to this. More specifically, another determination for determining whether the size of the compressed page data is equal to or smaller than any predetermined arbitrary condition (size) can be executed in step S203 instead of the above-described determination. More specifically, in step S203, the page compression processing unit 111 can determine whether the size of the compressed page data is equal to or smaller than the capacity of the cache of the page compression processing unit 111.

In addition, in the present exemplary embodiment, the page compression processing unit 111 assigns the compression level to data other than reusable data in step S508 (FIG. 8). Furthermore, as described above with reference to FIG. 9, the present exemplary embodiment compares compression levels of all data included in each page of the VDP data. However, the present exemplary embodiment is not limited to this. More specifically, the page compression processing unit 111 can also compare the compression level of the reusable data only instead of executing the above-described comparison Now, a second exemplary embodiment of the present invention will be described in detail below. In the above-described first exemplary embodiment, the determination of the compression level executed by the information processing apparatus 114 of the image forming system is implemented by the image forming unit 109 based on the mode set by the user. In the present exemplary embodiment, the image forming unit 109 selects the compression level based on the ratio of an area of each reusable data to page data.

As described above, the present exemplary embodiment is different from the above-described first exemplary embodiment primarily by a part of the method for determining the compression level. Accordingly, in the present exemplary embodiment, units, components, and configurations similar to those of the first exemplary embodiment are provided with the same reference numerals and symbols as used in FIGS. 1 through 13. Accordingly, the detailed description thereof will not be repeated here.

<Compression Level Merging Processing>

Figure 14:
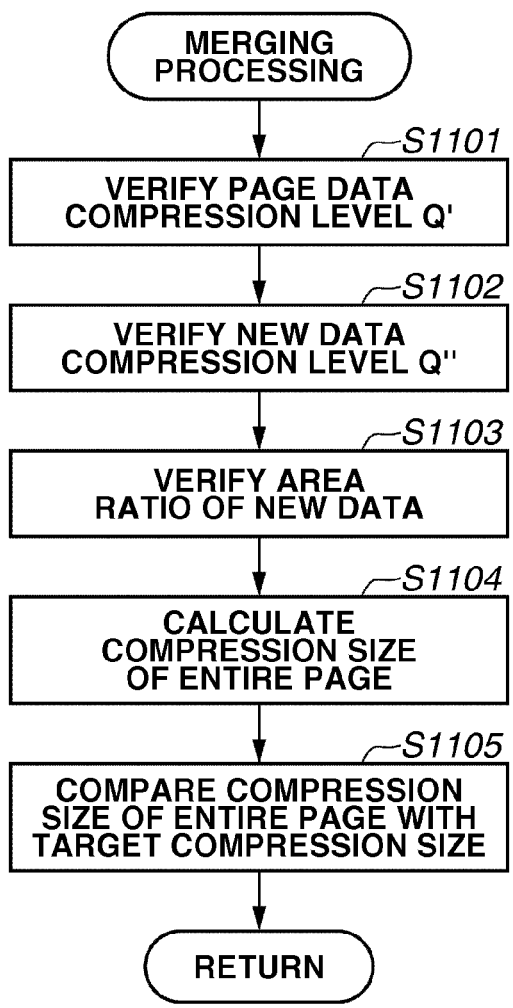
FIG. 14 is a flow chart illustrating an exemplary flow of processing executed in step S S509 illustrated in FIG. 8 according to a second exemplary embodiment of the present invention.

FIG. 14 is a flow chart illustrating an exemplary flow of the compression level merging processing executed in step S S509 illustrated in FIG. 8 according to an exemplary embodiment of the present invention.

The image forming unit 109 verifies the compression level assigned to the reusable data. In addition, the image forming unit 109 mutually compares the compression levels and selects an optimum compression level. In the following description of the present exemplary embodiment, an exemplary method executed by the image forming unit 109 for determining the compression level for the page data based on the ratio of the area of the reusable data to the page data will be described.

The image forming unit 109 verifies the compression level Q' for the page data stored in the image forming unit 109. In other words, the image forming unit 109 verifies the already determined compression level Q1 among the compression levels employed to the data read in step S501 in a past operation. Referring to FIG. 14, in step S1101, the image forming unit 109 calculates the compression size S' for the page data.

In step S1102, the image forming unit 109 verifies the compression level Q" for the newly read data, i.e., the compression level Q" employed to the data read in step S501 in the current operation. In addition, in step S1102, the image forming unit 109 calculates a compression size S" of the page data.

In step S1103, the image forming unit 109 calculates the area ratio of the newly read data.

The image forming unit 109 calculates the compression size for compressing the newly read data by multiplying the area ratio of the newly read data by the compression target size S that has been assigned to each compression level. In step S1104, the image forming unit 109 calculates a compression size S''' of the entire page by assigning all the data included in the page together.

The compression size can be calculated by using the following expression (1).

$$\text{Compression size of entire page} = \sum_{i=1}^{n} \text{compression size for data } i \times \text{area ratio of data } i \quad (1)$$

where "n" denotes the number of pieces of data included in each page.

In step S1105, the image forming unit 109 compares the compression size S''' and the compression target size S of the page data to calculate an optimum compression level for the page data.

Figure 15:
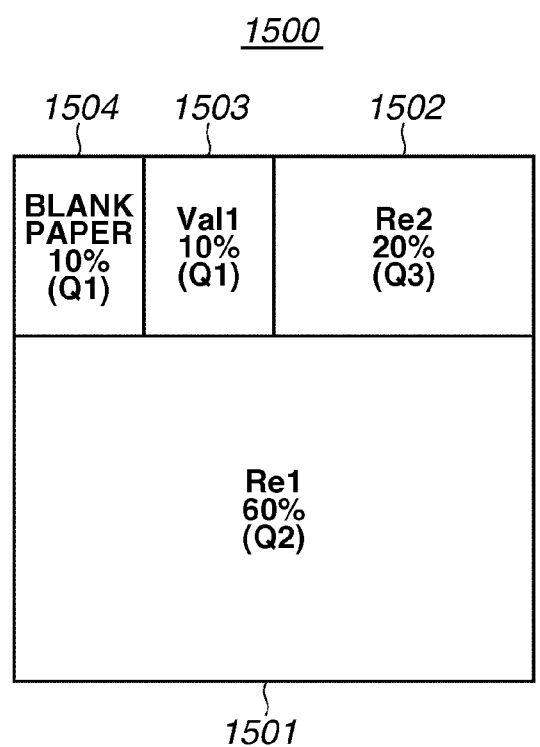
FIG. 15 illustrates an example of an area ratio of each data to page data.

FIG. 15 illustrates an example of an area ratio of each data included in page data 1500 to the page data 1500. Referring to FIG. 15, the area of each of reusable data 1501 and 1502 is 60% and 20% of the entire page data 1500, respectively. The area of variable data 1503 is 10% of the entire page data 1500. The area of a blank paper 1504 is 10% of the entire page data 1500.

FIG. 16 illustrates an example of the compression level 113, which is previously stored in the page compression processing unit 111 of the image forming apparatus 115. Referring to FIG. 16, in the present exemplary embodiment, it is supposed that the page compression processing unit 111 previously stores a plurality of predetermined compression levels.

The compression levels 113 correspond to the compression ratio of the page data. More specifically, the higher the value of the compression level becomes, the higher the compression ratio becomes but the lower the image quality of page data may become. On the contrary, the lower the compression level becomes, the lower the compression ratio becomes but the higher the image quality of page data becomes, which is closer to the image quality of the page data in a non-compressed state. For the compression level, in the present exemplary embodiment, a compression target size S for setting the compression level down to 1/n of the original image size is used.

The above-described processing will be described in more detail below with reference to FIG. 15. In the example illustrated in FIG. 15, it is supposed that the compression level 113 illustrated in FIG. 16 has been previously stored in the page compression processing unit 111. The expression (1) is applied as follows:

Compression size of entire page =

Compression target size of $Re1 \times 60\%$ + compression target size of $Re2 \times 20\%$ + compression target size of $Val1 \times 10\%$ + compression target size of blank paper $\times 10\%$ =

$1/4 \times 0.6 + 1/8 \times 0.2 + 1/2 \times 0.1 + 1/2 \times 0.1 = 0.275$

As described above, as a result of the calculation by the image forming unit 109 by using the expression (1), the compression size S''' of the page data of 0.275 is acquired. The image forming unit 109 compares the compression target size S of the page compression processing unit 111 with the compression size S'''. In the present exemplary embodiment, the compression target size of the compression level Q2 (¼=0.25) is closer to the compression size S''' (0.275) than the compression target size of the compression level Q1 (½=0.5). Accordingly, the image forming unit 109 determines (sets) the compression level Q2 as the compression level of the page data.

As described above, in the present exemplary embodiment, the compression size for the page data is calculated by multiplying the area ratio of data (object) constituting the page data to the entire page data by the compression size of the data and adding thereof for each data constituting the page data. Furthermore, the compression target size that is the closest to the compression size of the page data is determined (set) as the compression size of the page data. By performing the above-described processing, the present exemplary embodiment can determine an appropriate compression level even if a plurality of pieces of reusable data is included in the page data and if the area of the reusable data is very small.

As a modification of the present exemplary embodiment, the following configuration can be employed. More specifically, the calculation of the compression size, which is executed by multiplying the area ratio of the reusable data included in the page data to the entire page data by the compression size of the data is executed for each reusable data included in the page data. Furthermore, the compression level corresponding to the compression size with which the compression ratio becomes lowest, of the calculated compression sizes, is determined (set) as the compression size of the page data.

Now, a third exemplary embodiment of the present invention will be described in detail below. The method according to the above-described first exemplary embodiment is useful if the ratio of the variable data included in the page data to the entire page data is low. However, if the first exemplary embodiment is used, it may become necessary to execute recompression of the compressed page data according to the size or the content of the variable data. In the present exemplary embodiment, the comparison of the compression levels is executed after the compression level is determined, based on history information.

As described above, the present exemplary embodiment is different from the above-described first exemplary embodiment primarily by a part of the method for (finally) determining the compression level. Accordingly, in the present exemplary embodiment, units, components, and configurations similar to those of the first and the second exemplary embodiment are provided with the same reference numerals and symbols as used in FIGS. 1 through 16. Accordingly, the detailed description thereof will not be repeated here.

Figure 17:
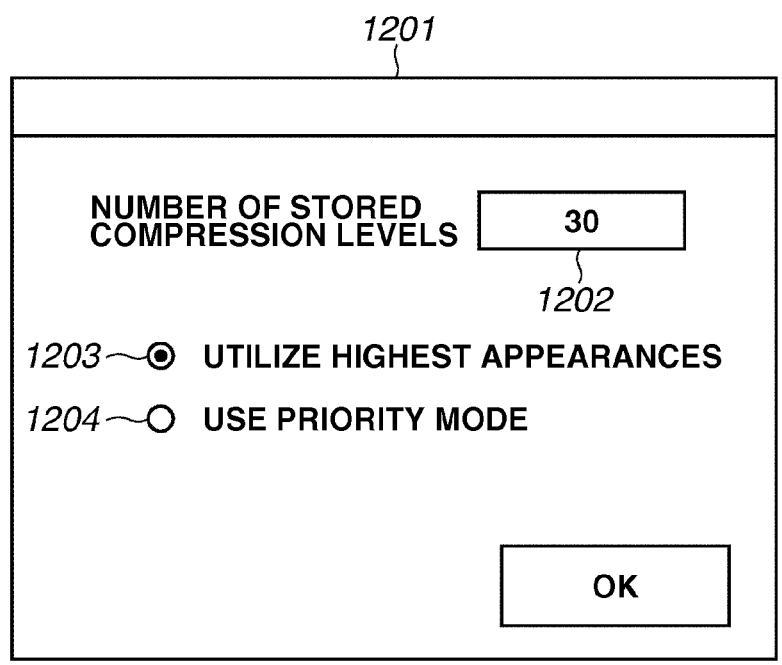
FIG. 17 illustrates an example of a UI for setting a compression level determination mode according to a third exemplary embodiment of the present invention.

In the present exemplary embodiment, the job controller 110 sets a mode to be used in utilizing history information according to an operation by the user input via a UI. FIG. 17 illustrates an example of a UI for setting a compression level determination mode.

In addition, in the present exemplary embodiment, the image forming unit 109 includes a table that stores a combination of reusable data included in page data and a final compression level, which are associated with each other. The image forming unit 109 sets records of the table in the number equivalent to the number of stored compression levels 1202 (i.e., the number of compression levels stored for one piece of reusable data), which is set by the user via a UI 1201. In the following description, the table is referred to as a "compression level history" where necessary.

<Page Data Generation Processing>

During processing for generating page data (in between steps S408 and 5409 illustrated in FIG. 7), the image forming unit 109 records a combination of reusable data that constitutes the page data in the compression level history.

<Data Registration Processing>

The image forming unit 109 records the final compression level of the page data transferred in registering the data in the compression level history after step S1403 illustrated in FIG. 13, for example.

<Compression Level Comparison Processing>

The image forming unit 109 executes compression level comparison processing after determining the compression level (i.e., after completing the processing in the flow chart of FIG. 8, for example).

FIG. 18 is a flow chart illustrating an exemplary flow of the compression level comparison processing. Referring to FIG. 18, in step S1501, the job controller 110 receives a user operation input via the UI 1201, which designates a condition for selecting an optimum compression level. In the example illustrated in FIG. 17, the job controller 110 receives an input value of the number of stored compression levels 1202 and user selections executed via radio buttons 1203 and 1204.

In step S1502, the image forming unit 109 searches the compression level history for a table that stores the combination of the reusable data constituting the page data generated by the page data generation processing.

In addition, the image forming unit 109 searches for an optimum compression level based on the table extracted in step S1502, which stores the combination of the reusable data constituting the page data, and the compression level calculated by the compression level determination processing. As illustrated in FIG. 17, two different conditions are presented to the user.

In step S1503, the image forming unit 109 determines whether the radio button 1203, which is a radio button for selecting the utilization of the most frequent appearance value, has been selected via the UI 1201. If it is determined that the radio button 1203 has been selected (YES in step S1503), then the processing advances to step S1504. Instep S1504, the image forming unit 109 calculates a compression level whose appearance is the most frequent of those of all the compression levels based on the history of the compression levels that have used the same reusable data and the compression level calculated by the compression level determination processing described above.

In the example illustrated in FIG. 17, the number of stored compression levels 1202 is thirty. By adding a compression level, which is obtained by the compression level determination processing, to the number of stored compression levels 1202 (i.e., thirty), the total number of compression levels of thirty-one is obtained. Accordingly, the image forming unit 109 calculates the compression level whose appearance is the most frequent of those of all the thirty-one compression levels in total. In addition, the image forming unit 109 sets the compression level having the most frequent appearance as the optimum compression level.

On the other hand, if it is determined that the radio button 1204, which is a radio button for selecting the utilization of the priority mode, has been selected instead of the radio button 1203, which is a radio button for selecting the utilization of the most frequent appearance (NO in step S1503), then the processing advances to step S1505. In step S1505, the image forming unit 109 verifies the flag stored therein. The flag is set by the user by selecting either one of the radio button 602 illustrated in FIG. 10, which is a radio button for selecting the image quality priority mode, and the radio button 603, which is a radio button for selecting the speed priority mode.

In step S1506, the image forming unit 109 determines whether the value "S" has been set to the flag (i.e., whether the speed priority mode has been set). If it is determined that the value "S" has been set to the flag (YES in step S1506), then the processing advances to step S1507. In step S1507, the image forming unit 109 selects the highest compression level by referring to and based on the compression level history and the compression level determined by the compression level determination processing, and sets the selected compression level as the optimum compression level.

In the example illustrated in FIG. 17, the number of stored compression levels 1202 is thirty. By adding a compression level, which is obtained by the compression level determination processing, to the number of stored compression levels 1202 (i.e., thirty), the total number of compression levels of thirty-one is obtained. Accordingly, the image forming unit 109 calculates the compression level whose appearance is the most frequent of those of all the thirty-one compression levels in total. In addition, the image forming unit 109 sets the compression level having the most appearance as the optimum compression level.

On the other hand, if it is determined that the value "G" (i.e., the value corresponding to the image quality priority mode) has been set instead of the value "S" (NO in step S1506), then the processing advances to step S1508. Instep S1508, the image forming unit 109 selects the lowest compression level by referring to and based on the compression level history and the compression level determined by the compression level determination processing, and sets the selected compression level as the optimum compression level.

In the example illustrated in FIG. 17, the number of stored compression levels 1202 is thirty. By adding a compression level, which is obtained by the compression level determination processing, to the number of stored compression levels 1202 (i.e., thirty), the total number of compression levels of thirty-one is obtained. Accordingly, the image forming unit 109 calculates the compression level whose appearance is the least of those of all of the thirty-one compression levels in total. In addition, the image forming unit 109 sets the compression level having the least appearance as the optimum compression level.

Furthermore, the image forming unit 109 transfers the compression level calculated by the compression level determination processing and the optimum compression level calculated based on the compression level history as the compression level of the page data.

As described above, in the present exemplary embodiment, the optimum compression level is determined based on the compression level that has been used in a past operation for the combination of the reusable data constituting the page data generated by the page data generation processing and the compression level determined by the compression level determination processing. More specifically, the optimum compression level is determined according to the condition for selecting the compression level set by the user. With the above-described configuration, the present exemplary embodiment can provide an optimum compression level even if the variable data affects the page data much and if the compression level of the page data varies record by record.

Each exemplary embodiment of the present invention is as described above. However, the present invention is not limited to the above-described exemplary embodiments.

The present invention can also be achieved by providing a system or an apparatus with a storage medium storing program code of software implementing the functions of the embodiments and by reading and executing the program code stored in the storage medium with a computer of the system or the apparatus (a CPU or a micro processing unit (MPU)). In this case, the program code itself, which is read from the storage medium, implements the functions of the embodiments described above, and accordingly, the storage medium storing the program code constitutes the present invention.

In addition, the present invention can also be implemented by modifying or altering the present invention within the scope of the present invention instead of or in addition to the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-298747 filed Dec. 28, 2009, which is hereby incorporated by reference herein in its entirety.

What is claimed is:

1. An information processing apparatus comprising:
an analysis unit configured to analyze image generation instruction data including a reusable object, a variable object, and layout information about the objects;
a storage unit configured to store raster data of the reusable object;
a generation unit configured to generate image data based on a combination, which is determined according to the layout information of the object, of the raster data of the reusable object stored on the storage unit and the raster data of the variable object included in the image generation instruction data;

a derivation unit configured to derive information about a compression ratio of the image data generated by the generation unit;

an assignation unit configured to assign the information about the compression ratio used in compressing the image data including the reusable object to the reusable object; and an output unit configured to output the image data generated by the generation unit and the information about the compression ratio derived by the derivation unit to a compression unit configured to compress the image data, wherein the derivation unit is configured, if a reusable object similar to the reusable object to which the information about the compression ratio has been assigned is included in the image data generated by the generation unit, to derive the information about the compression ratio assigned to the reusable object as a compression ratio of the image data generated by the generation unit.

2. The information processing apparatus according to claim 1, wherein the assignation unit is configured to assign, to the reusable object, the information about the compression ratio used in compressing the image data including the reusable object by using the compression unit so that a size of the image data including the reusable object may become equal to or smaller than a predetermined size.

3. The information processing apparatus according to claim 1, wherein the assignation unit is configured to assign the information about the compression ratio of the image data including the reusable object to the reusable object included in the image generation instruction data as metadata.

4. The information processing apparatus according to claim 1, wherein the assignation unit is configured to assign the information about the compression ratio of the image data including the reusable object to the raster data of the reusable object stored on the storage unit as metadata.

5. The information processing apparatus according to claim 1, wherein the derivation unit is configured to read the information about the compression ratio assigned to the reusable object similar to the reusable object included in the image generation instruction data, and configured to derive information about a highest compression ratio or information about a lowest compression ratio, among the information about the compression ratio assigned to the reusable object included in the image generation instruction data, as the information about the compression ratio of the image data generated by the generation unit.

6. The information processing apparatus according to claim 5, wherein the derivation unit is configured, according to a result of an operation by a user, to derive either of the information about the highest compression ratio or the information about the lowest compression ratio, among the information about the compression ratio assigned to the object included in the image generation instruction data, as the information about the compression ratio of the image data generated by the generation unit.

7. The information processing apparatus according to claim 1, wherein the assignation unit is configured to assign information about a predetermined compression ratio to an object different from the reusable object, of objects included in the image generation instruction data, and wherein the derivation unit is configured to derive the information about the compression ratio of the image data generated by the generation unit by multiplying an area ratio of the object to an entire page by the compression ratio assigned to the object and based on a value in which the multiplied values are added.

8. The information processing apparatus according to claim 1, further comprising:

a holding unit configured to mutually associate and store a combination of reusable objects constituting the image data and the information about the compression ratio used in compressing the image data; and a determination unit configured to calculate the information about the highest compression ratio, the information about the lowest compression ratio, or information about a compression ratio having a most frequent appearance based on the information about the compression ratio associated with a combination similar to the combination of reusable objects included in the image data generated by the generation unit and based on the information about the compression ratio derived by the derivation unit, and configured to determine the calculated information to be the information about the compression ratio of the image data generated by the generation unit, wherein the output unit is configured to output the image data generated by the generation unit and the information about the compression ratio determined by the determination unit to the compression unit.

9. The information processing apparatus according to claim 8, wherein the determination unit is configured, according to the result of the operation by the user, to calculate the information about the highest compression ratio, the information about the lowest compression ratio, and the information about the compression ratio having the most frequent appearance based on the information about the compression ratio associated, by the holding unit, with the combination similar to the combination of reusable objects included in the image data generated by the generation unit and based on the information about the compression ratio derived by the derivation unit.

10. An image compression method comprising:

analyzing image generation instruction data including a reusable object, a variable object, and layout information about the objects;

storing raster data of the reusable object;

generating image data by combining the raster data of the stored reusable object and the raster data of the variable object included in the image generation instruction data based on the layout information;

deriving information about a compression ratio of the generated image data;

assigning the information about the compression ratio used in compressing the image data including the reusable object to the reusable object; and compressing the image data based on the generated image data and the derived information about the compression ratio, wherein the deriving includes deriving, if a reusable object similar to the reusable object to which the information about the compression ratio has been assigned is included in the image data, the information about the compression ratio assigned to the reusable object as a compression ratio of the generated image data.

11. The image compression method according to claim 10, wherein the assigning includes assigning, to the reusable object, the information about the compression ratio when the image data including the reusable object is compressed so that a size of the image data including the reusable object may become equal to or smaller than a predetermined size.

12. The image compression method according to claim 10, wherein assigning the information about the compression ratio of the image data including the reusable object to the reusable object included in the image generation instruction data as metadata.

13. The image compression method according to claim 10, wherein assigning the information about the compression ratio of the image data including the reusable object to the raster data of the stored reusable object as metadata.

14. The image compression method according to claim 10,
wherein reading the information about the compression ratio assigned to the reusable object similar to the reusable object included in the image generation instruction data, and
wherein deriving information about a highest compression ratio or information about a lowest compression ratio, among the information about the compression ratio assigned to the reusable object included in the image generation instruction data as the information about the compression ratio of the generated image data.

15. The image compression method according to claim 14, wherein deriving, according to a result of an operation by a user, either of the information about the highest compression ratio or the information about the lowest compression ratio, among the information about the compression ratio assigned to the object included in the image generation instruction data as the information about the compression ratio of the generated image data.

16. The image compression method according to claim 10,
wherein assigning information about a predetermined compression ratio to an object different from the reusable object, of objects included in the image generation instruction data, and
wherein deriving the information about the compression ratio of the generated image data by multiplying an area ratio of the object to an entire page by the compression ratio assigned to the object based on a value calculated by assigning results of the multiplication for each object included in the image generation instruction data.

17. The image compression method according to claim 10, further comprising:
mutually associating and storing a combination of reusable objects constituting the image data and the information about the compression ratio used in compressing the image data;
calculating the information about the highest compression ratio, the information about the lowest compression ratio, or information about a compression ratio having a most appearance based on the information about the compression ratio associated with a combination similar to the combination of reusable objects included in the generated image data and based on the derived information about the compression ratio; and
determining the calculated information to be the information about the compression ratio of the generated image data,
wherein compressing the image data based on the generated image data and the determined information about the compression ratio.

18. The image compression method according to claim 17, wherein determining, according to the result of the operation by the user, the information about the highest compression ratio, the information about the lowest compression ratio, and the information about the compression ratio having the most frequent appearance based on the information about the compression ratio associated with the combination similar to the combination of reusable objects included in the generated image data and based on the derived information about the compression ratio.

19. A non-transitory computer-readable storage medium storing instructions which, when executed by a computer, causes the computer to function as each unit of the information processing apparatus according to claim 1.

* * * * *